(12) United States Patent
Miura et al.

(10) Patent No.: US 7,960,886 B2
(45) Date of Patent: Jun. 14, 2011

(54) ROTATING ELECTRIC MACHINE

(75) Inventors: Tetsuya Miura, Nishikamo-gun (JP);
Yoshiyuki Hisamatsu, Anjo (JP)

(73) Assignee: Toyota Jidosha Kabushiki Kaisha,
Aichi-ken (JP)

( * ) Notice: Subject to any disclaimer, the term of this patent is extended or adjusted under 35 U.S.C. 154(b) by 0 days.

(21) Appl. No.: 12/664,332

(22) PCT Filed: Jun. 10, 2008

(86) PCT No.: PCT/JP2008/060935
§ 371 (c)(1),
(2), (4) Date: Dec. 11, 2009

(87) PCT Pub. No.: WO2008/153171
PCT Pub. Date: Dec. 18, 2008

(65) Prior Publication Data
US 2010/0181864 A1 Jul. 22, 2010

(30) Foreign Application Priority Data
Jun. 13, 2007 (JP) .................. 2007-156350

(51) Int. Cl.
*H02K 21/12* (2006.01)
(52) U.S. Cl. ............... 310/156.57; 310/216.094
(58) Field of Classification Search ............ 310/156.57, 310/216.094
See application file for complete search history.

(56) References Cited

U.S. PATENT DOCUMENTS

| | | | | |
|---|---|---|---|---|
| 6,967,424 | B2 * | 11/2005 | Popov | 310/216.023 |
| 7,327,062 | B2 * | 2/2008 | Kaneko | 310/156.57 |
| 7,605,510 | B2 * | 10/2009 | Okuma et al. | 310/156.53 |
| 2002/0047432 | A1 | 4/2002 | Miyashita et al. | |

FOREIGN PATENT DOCUMENTS

| | | |
|---|---|---|
| JP | 2002-010593 A | 1/2002 |
| JP | 2002-165394 A | 6/2002 |
| JP | 2002-305859 A | 10/2002 |
| JP | 2004-72845 A | 3/2004 |
| JP | 2004-088846 A | 3/2004 |
| JP | 2004-328956 A | 11/2004 |
| JP | 2005-124281 A | 5/2005 |
| JP | 2005-210826 A | 8/2005 |
| JP | 2005-354798 A | 12/2005 |
| JP | 2006-060915 A | 3/2006 |
| JP | 2007-97387 A | 4/2007 |

* cited by examiner

Primary Examiner — Dang D Le
(74) Attorney, Agent, or Firm — Sughrue Mion, PLLC

(57) ABSTRACT

A rotating electric machine includes a stator having a plurality of winding phases formed by distributed winding, a rotor having a plurality of magnetic poles and an outer circumference facing the stator, a first groove formed in the outer circumference of the rotor, a second groove formed in a position opposite to reference magnetic poles closest to the first groove, of the magnetic poles, with respect to the first groove, and a protrusion positioned between the first groove and the second groove and defined by the first and second grooves, and a ratio of a width half the width of the protrusion in a circumferential direction of the rotor to a width of the first groove and the second groove in the circumferential direction of the rotor is not smaller than 0.37 and not greater than 6.

8 Claims, 5 Drawing Sheets

24TH-ORDER COMPONENT OF TORQUE RIPPLE

48TH-ORDER COMPONENT OF TORQUE RIPPLE

24TH-ORDER COMPONENT OF RADIAL FORCE

48TH-ORDER COMPONENT OF RADIAL FORCE

ROTATING ELECTRIC MACHINE

TECHNICAL FIELD

The present invention relates to a rotating electric machine, and more particularly to a rotating electric machine achieving noise reduction.

BACKGROUND ART

In general, it is desired to reduce a torque ripple and cogging torque in a rotating electric machine mounted on a vehicle. A torque ripple is an amount of variation in output torque expressed as a percentage with respect to average torque, and it is generally known that as this torque ripple increases, vibration and noise increase in a rotating electric machine.

For example, Japanese Patent Laying-Open No. 2005-354798, Japanese Patent Laying-Open No. 2005-124281 and Japanese Patent Laying-Open No. 2005-210826 describe rotating electric machines as rotating electric machines achieving cogging torque reduction.

In regard to the above conventional rotating electric machines, however, a technique of reducing a torque ripple of a particular order, focusing thereon, is not described at all.

Particularly, none of the above conventional techniques suggests reducing noise of a particular order, focusing on a correlation between a harmonic component of noise generated in the rotating electric machine, and a torque ripple component of the particular order and a radial force component of the particular order.

That is, in regard to the above conventional rotating electric machines, no attention is paid to the fact that, in motor noise generated in the rotating electric machine, a motor noise component of a particular order is made larger through the Fourier transform. As a result, the motor noise cannot be reduced sufficiently in the above conventional rotating electric machines.

DISCLOSURE OF THE INVENTION

The present invention was made in view of the above-discussed problems, and an object thereof is to provide a rotating electric machine achieving noise reduction.

In one aspect, a rotating electric machine according to the present invention includes a stator having a plurality of winding phases formed by distributed winding, a rotor having a plurality of magnetic poles and an outer circumference facing the stator, a first groove formed in the outer circumference of the rotor, and a second groove formed in a position opposite to reference magnetic poles closest to the first groove, of the magnetic poles, with respect to the first groove.

The rotating electric machine also includes a protrusion positioned between the first groove and the second groove and defined by the first and second grooves, and a ratio of a width half the width of the protrusion in a circumferential direction of the rotor to a width of the first groove and the second groove in the circumferential direction of the rotor is not smaller than 0.37 and not greater than 6.

Preferably, the width of the first groove in the circumferential direction of the rotor is not smaller than 0.46 degrees and not greater than 3.45 degrees in electrical angle, and the width of the protrusion in the circumferential direction of the rotor is not smaller than 5.1 degrees and not greater than 11.08 degrees.

Preferably, the width of the first groove in the circumferential direction of the rotor is not smaller than 2.0 degrees and not greater than 3.45 degrees in electrical angle, and the width of the protrusion is not smaller than 5.1 degrees and not greater than 8.0 degrees in electrical angle.

Preferably, a sum of an electrical angle of the width half the width of the protrusion in the circumferential direction of the rotor and an electrical angle of the width of the first groove in the circumferential direction of the rotor is constant.

Preferably, the groove extends from a reference position on the outer circumference of the rotor, away from a center line of the reference magnetic poles closest to the groove, and the reference position is positioned such that an electrical angle formed by an imaginary straight line passing through the reference position and a central point of the rotor and by the center line of the reference magnetic poles is set to 84 degrees.

In another aspect, a rotating electric machine according to the present invention includes a stator having a plurality of winding phases formed by distributed winding, a rotor having a plurality of magnetic poles and an outer circumference facing the stator, a permanent magnet buried in the rotor and defining the magnetic pole, and a plurality of salient pole portions positioned radially outward in the rotor relative to the magnet and formed on the outer circumference of the rotor at a distance from one another in a circumferential direction of the rotor.

The rotating electric machine also includes a groove formed in the outer circumference of the rotor adjacent to the salient pole portion and extending from a circumferential end of the salient pole portion to a position between the circumferential end and a first reference position of the rotor, and the first reference position is positioned such that an electrical angle formed by an imaginary straight line passing through the first reference position and a central point of the rotor and by a center line of the magnetic pole is set to 90 degrees. Further, in this rotating electric machine, a ratio of an electrical angle of the groove in the circumferential direction of the rotor to an electrical angle half the electrical angle of the salient pole portion in the circumferential direction of the rotor is greater than 0 and not greater than 0.07.

In another aspect, a rotating electric machine according to the present invention includes a stator having a plurality of winding phases formed by distributed winding, a rotor having a plurality of magnetic poles and an outer circumference facing the stator, a plurality of salient pole portions formed on the outer circumference of the rotor at a distance from one another in a circumferential direction of the rotor, and a groove formed in the outer circumference of the rotor adjacent to the salient pole portion. An electrical angle formed by a first end imaginary straight line defined by one circumferential end of the salient pole portion and a central point of the rotor and by a second end imaginary straight line defined by the other circumferential end of the salient pole portion and the central point of the rotor is set to 84 degrees.

It is intended as of filing to combine the above-described features with one another as appropriate.

According to the rotating electric machine of the present invention, a particular harmonic component of noise can be reduced.

BEST MODES FOR CARRYING OUT THE INVENTION

Figure 1:
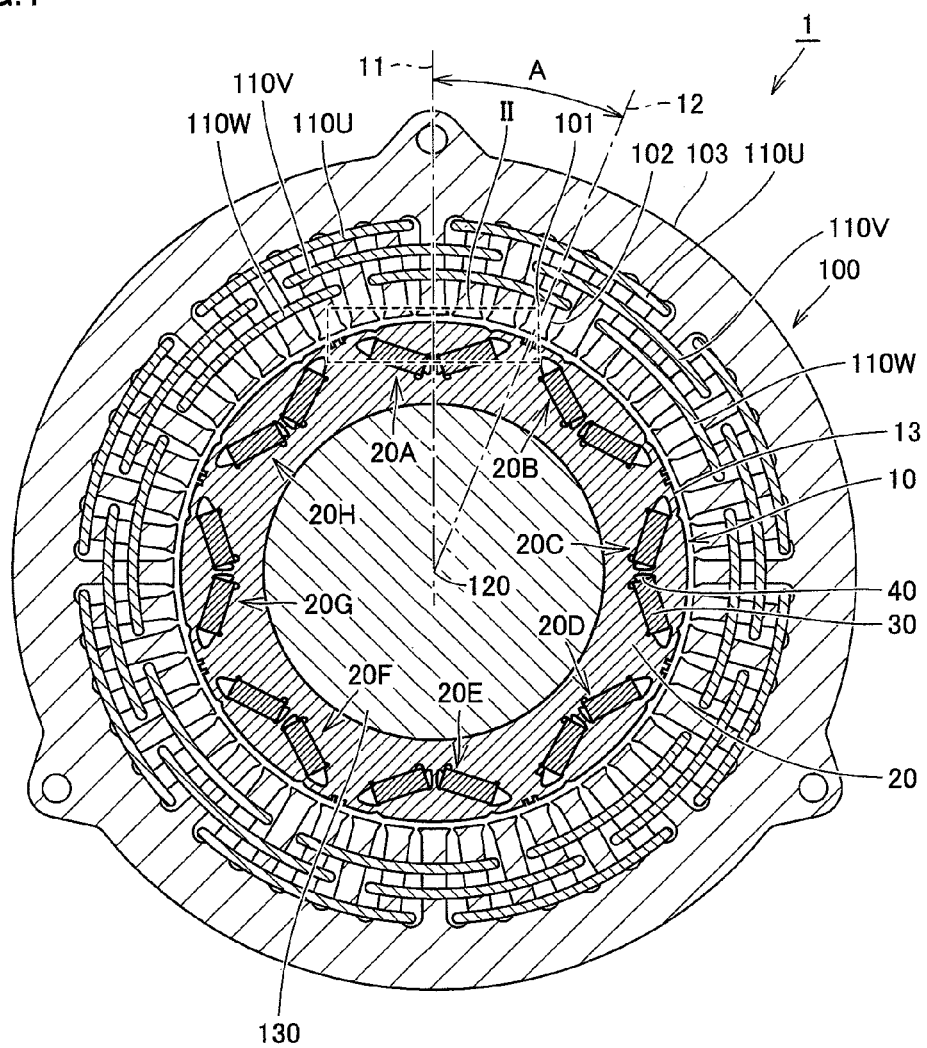
FIG. 1 is a cross-sectional view of a rotating electric machine according to the present embodiment.

A rotating electric machine 1 according to the present embodiment will be described with reference to FIGS. 1 to 9. It is noted that the same or corresponding elements have the same reference characters, and the description thereof will not be repeated.

Figure 2:
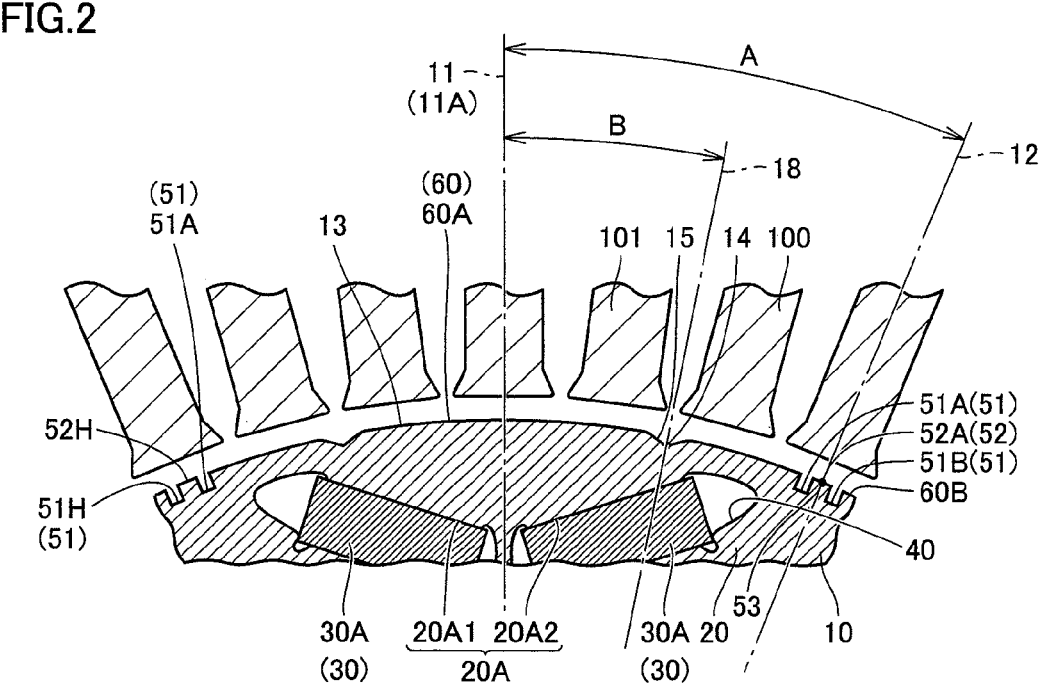
FIG. 2 is an enlarged view of a portion indicated with II in FIG. 1.

FIG. 1 is a cross-sectional view of rotating electric machine 1 according to the present embodiment. FIG. 2 is an enlarged view of a portion indicated with II in FIG. 1.

As shown in FIGS. 1 and 2, rotating electric machine 1 includes a stator 100 having a U-phase coil 110U, a V-phase coil 110V, and a W-phase coil 110W as a plurality of winding phases formed by distributed winding, and a rotor 10 having permanent magnets 30 as a plurality of magnetic poles and an outer circumferential surface (outer circumference) 13 facing stator 100.

Stator 100 includes an annular core body 103, and is structured by stacking a plurality of magnetic steel plates, for example. Stator teeth 101 protruding radially inward are formed on an inner circumferential surface of this core body 103. A slot portion (recess) 102 is formed between these stator teeth 101, each slot portion 102 opening toward the inner circumference of core body 103. Forty-eight slot portions 102 are formed in rotating electric machine 1 according to the present embodiment.

U-phase coil 110U, V-phase coil 110V, and W-phase coil 110W as the winding phases are wound around stator teeth 101 by distributed winding. Namely, rotating electric machine 1 is a three-phase motor generator. U-phase coil 110U is positioned on an outermost side of core body 103, and V-phase coil 110V is positioned on a radially inward side relative to this U-phase coil 110U. W-phase coil 110W is positioned on a radially inward side relative to this V-phase coil 110V.

Although the coils are directly wound around stator teeth 101 in this example shown in FIG. 1, each coil may alternatively be attached with an insulator being interposed, for example.

U-phase coil 110U, V-phase coil 110V, and W-phase coil 110W thus wound are supplied with AC power out of phase from one another. Consequently, magnetic fluxes passing through respective coils 110U, 110V, and 110W are generated.

Rotor 10 includes a cylindrical core body 20 formed by stacking electromagnetic steel plates made of iron, iron metal or the like.

In this core body 20, a plurality of magnet accommodating portions 20A to 20H provided at a distance from one another in a circumferential direction of core body 20, for accommodating permanent magnets 30, are formed.

Magnet accommodating portion 20A includes a pair of holes 20A1 and 20A2, which are slightly distant from each other in the circumferential direction of core body 20. Permanent magnet 30 (30A) is accommodated in these holes 20A1 and 20A2. A gap 40 is formed between an inner surface of core body 20 defining each of holes 20A1, 20A2 and permanent magnet 30. This gap 40 is positioned at each one end of permanent magnet 30.

A magnetic polarity of a surface of permanent magnet 30 accommodated in hole 20A1 on the outer circumferential surface side of core body 20, and a magnetic polarity of a surface of permanent magnet 30 accommodated in hole 20A2 on the outer circumferential surface side of core body 20 are the same.

Other magnet accommodating portions 20B to 20H each have a pair of holes as in the above magnet accommodating portion 20A, and each hole accommodates permanent magnet 30.

A magnetic polarity of permanent magnets 30 accommodated in one of magnet accommodating portions 20A to 20H on the outer circumferential surface side of core body 20, and a magnetic polarity of permanent magnets 30 accommodated in any other magnet accommodating portions 20A to 20H adjacent to the one of magnet accommodating portions 20A to 20H in the circumferential direction of core body 20 on the outer circumferential surface side of core body 20 are different from each other. Thus, arrangement is such that the magnetic polarity of magnets 30 accommodated in magnet accommodating portions 20A to 20H on the outer circumferential surface side alternates in the circumferential direction of core body 20. Rotating electric machine 1 is a motor generator having three phases and eight poles.

In FIGS. 1 and 2, the magnetic properties of permanent magnets 30A accommodated in respective holes 20A1 and 20A2 of magnet accommodating portion 20A on the outer circumference side are the same. In addition, the magnetic polarity of permanent magnets 30A accommodated in magnet accommodating portion 20A on the outer circumference side and the magnetic polarity of permanent magnets 30 accommodated in the holes of magnet accommodating portions 20B and 20H adjacent to this magnet accommodating portion 20A on the outer circumference side are different from each other.

Accordingly, a center line 11A of the magnetic poles of permanent magnets 30A accommodated in magnet accommodating portion 20A passes between hole 20A1 and hole 20A2, through a central point 120 of core body 20. Further, an imaginary straight line 12 forming an electrical angle of 90 degrees with respect to this center line 11 passes between magnet accommodating portion 20A and magnet accommodating portion 20B adjacent to this magnet accommodating portion 20A in the circumferential direction of core body 20, through central point 120.

In this manner, rotor 10 includes the plurality of permanent magnets 30, and stator 100 rotates as a result of supply of AC power to coils 110U, 110V, and 110W of stator 100. Rotor 10 is secured to a rotary shaft 130 inserted in a through hole formed in a central portion of rotor 10, and this rotary shaft 130 is rotatably supported. As shown in FIG. 2, a salient pole portion 60 is formed on outer circumferential surface 13 of rotor 10, in a radially outward position of rotor 10 relative to permanent magnets 30 accommodated in magnet accommodating portion 20. A groove 14 is formed in a circumferential surface of this salient pole portion 60. An electrical angle defined by an imaginary straight line passing through the bottom of this groove 14 and central point 120 of rotor 10 and by center line 11 is not smaller than 6 degrees and not greater than 22 degrees.

A groove 51 is formed in a position adjacent to this salient pole portion 60 in the circumferential direction of rotor 10. Groove 51 is positioned at opposing end sides of salient pole portion 60 in the circumferential direction. In FIG. 2, a groove 51A is closest to permanent magnet 30A among all permanent magnets 30. Two grooves 51A are formed in positions symmetrical with respect to center line 11A of the magnetic poles of permanent magnets 30A in rotor 10. These two symmetrically arranged grooves 51A define the above salient pole portion 60A.

Figure 3:
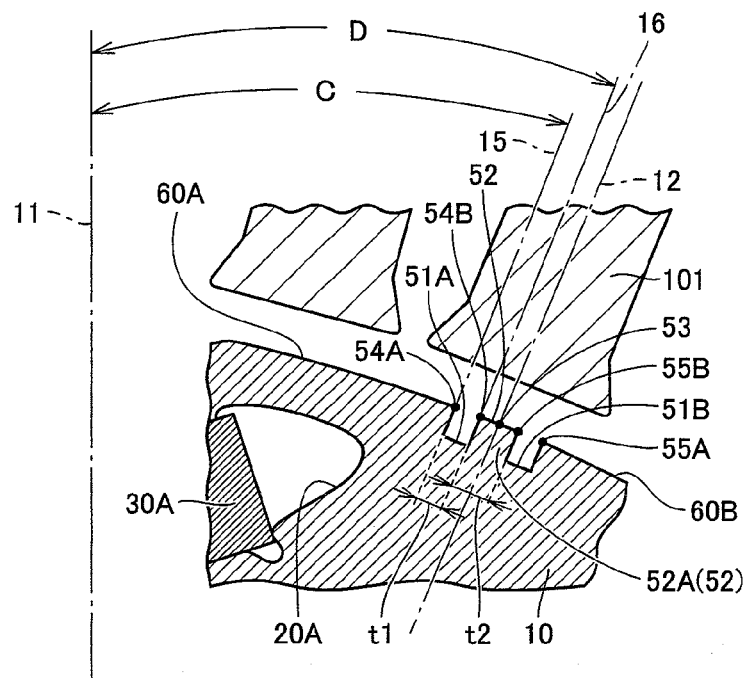
FIG. 3 is an enlarged view showing a groove and its vicinity.

FIG. 3 is an enlarged view showing groove 51A and its vicinity. As shown in FIG. 3, an electrical angle C defined by an imaginary straight line 15 passing through one circumferential end 54A of a salient pole portion 60A and a central point O of rotor 10 and by center line 11 of the magnetic poles of permanent magnets 30A is set to 84 degrees, and a width of salient pole portion 60A in the circumferential direction (electrical angle C×2) is set to 168 degrees (electrical angle). That is, salient pole portion 60 is formed symmetrically with respect to center line 11.

Groove 51A extends from circumferential end (reference position) 54A of this salient pole portion 60A toward a reference position 53 in the circumferential direction of rotor 10. Reference position 53 is positioned such that the electrical angle defined by imaginary straight line 12 passing through reference position 53 and the central point of rotor 10 and by center line 11 of the magnetic poles of permanent magnets 30A is set to 90 degrees.

Groove 51A extends from circumferential end 54A of salient pole portion 60A toward reference position 53, and reaches a position between circumferential end 54A and reference position 53.

Salient pole portion 60 is formed for each permanent magnet 30, and the width of each salient pole portion 60 is set to 168 degrees in electrical angle. Groove 51 is formed in a position adjacent to this salient pole portion 60. In addition, as shown in FIG. 3, for example, one circumferential end 55A of a salient pole portion 60B is located in a position forming 84 degrees (electrical angle) from center line 11 of permanent magnets 30B toward permanent magnets 30A, and a groove 51B is formed in outer circumferential surface 13 of rotor 10 adjacent to this circumferential end 55A on the side of permanent magnets 30A.

Groove 51A and groove 51B are positioned symmetrically with respect to imaginary straight line 12 passing through reference position 53 and central point O of rotor 10, as shown in FIG. 3.

Each groove 51 has the same width, and if the width of each groove 51 is less than 6 degrees, a protrusion 52 is defined between grooves 51.

Thus, as shown in FIG. 3, a protrusion 52A is defined between groove 51A and groove 51B. A circumferential center of a tip of this protrusion 52A is located in a position forming an electrical angle of 90 degrees with respect to center lines 11 of the respective magnetic poles of permanent magnets 30A and permanent magnets 30B.

Namely, the above reference position 53 is positioned at the circumferential center of the tip of protrusion 52A, and grooves 51A and 51B are formed adjacently on both sides of this protrusion 52A.

The width of each salient pole portion 60 in the circumferential direction is set to 168 degrees (electrical angle), and salient pole portions 60 are arranged at regular intervals on outer circumferential surface 13 of rotor 10. Accordingly, a width of a portion between salient pole portions 60 is 12 degrees (electrical angle).

Therefore, a sum of an electrical angle of a width half the width of protrusion 52 in the circumferential direction and an electrical angle of the width of groove 51A or groove 51B is 6 degrees (electrical angle). Namely, assuming that the width of groove 51A in the circumferential direction is t1 degrees (electrical angle) and further the width of protrusion 52A is t2 degrees (electrical angle) in FIG. 3, t1+t2/2=6 degrees. Electrical angle of t1 representing the width of groove 51A in the circumferential direction is an electrical angle defined by an imaginary straight line passing through a point defining a portion of the largest width in the circumferential direction of an opening edge portion of groove 51A and through central point O, and by an imaginary straight line passing through the other point and central point O. In rotating electric machine 1 according to the present embodiment, grooves 51 extend in a direction of an axis of rotor 10, and have a width in a uniform square shape. In addition, grooves 51 also have a uniform depth in the axial direction of rotor 10.

Figure 4:
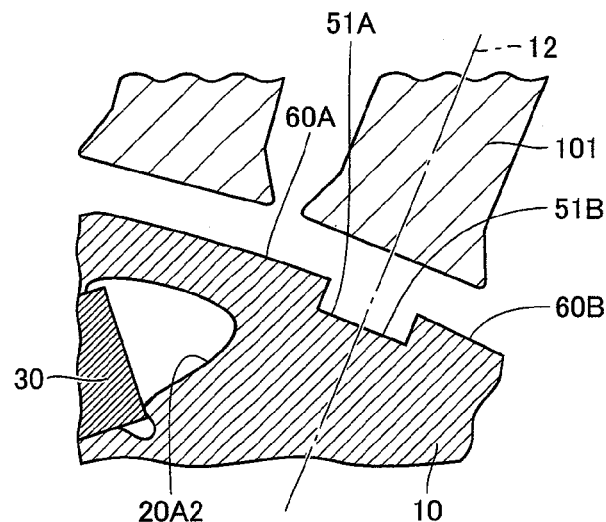
FIG. 4 is an enlarged view showing grooves and their vicinity in the rotating electric machine when a width of the grooves has an electrical angle of 6 degrees.

Moreover, a ratio G of width t1 of groove 51A to half of electrical angle C of the width of salient pole portion 60A in the circumferential direction (=t1/(C/2)) is greater than 0 and not greater than 0.07. FIG. 4 is an enlarged view showing grooves 51A, 51B, and their vicinity in rotating electric machine 1 when the width of grooves 51A and 51B has an electrical angle of 6 degrees.

When grooves 51A and 51B have an electrical angle of 6 degrees as in this case, the grooves are in communication with each other, and projection 52 is not defined.

Figure 5:
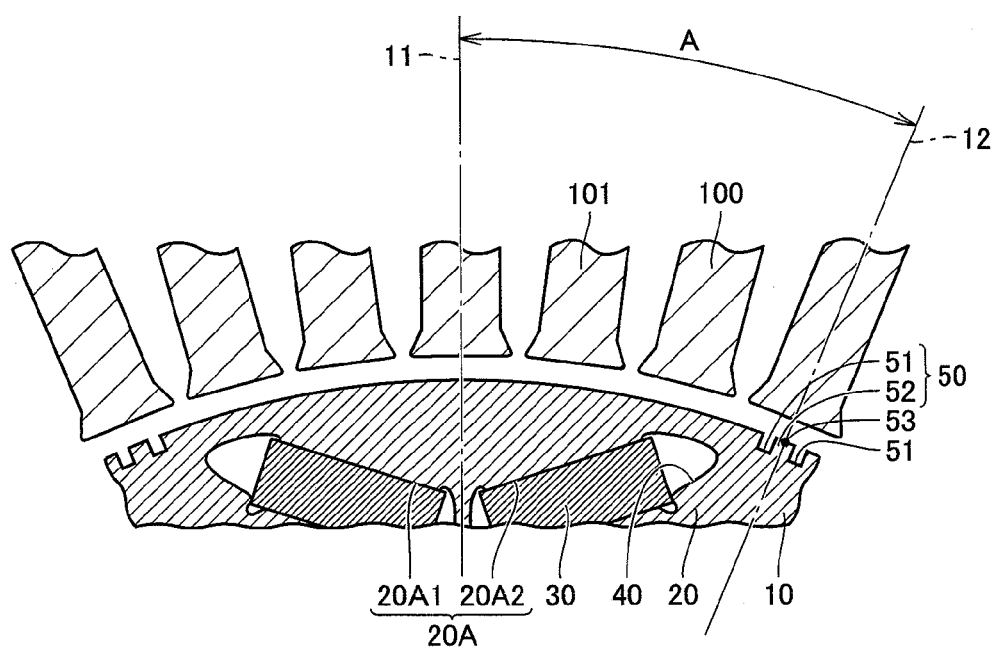
FIG. 5 is a cross-sectional view showing a variation of a rotor.

Although groove 14 is formed in FIGS. 1 to 4 and can also serve to reduce a 24th-order component of a torque ripple, this groove 14 is not an essential feature. FIG. 5 is a cross-sectional view showing a variation of rotor 10, and groove 14 does not need to be formed as shown in FIG. 5.

Figure 6:
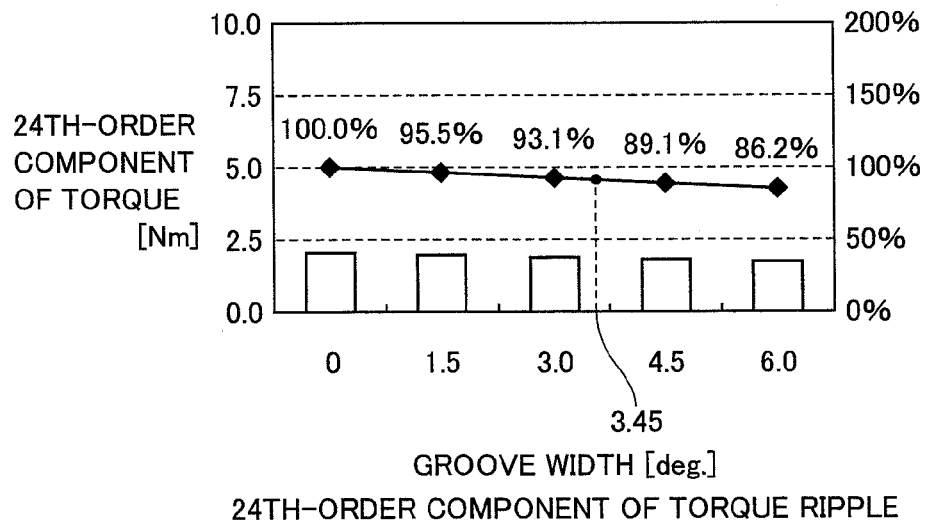
FIG. 6 is a graph showing simulation results, which illustrates a 24th-order component of a torque ripple generated when various types of rotating electric machines having different groove widths are driven.
Figure 7:
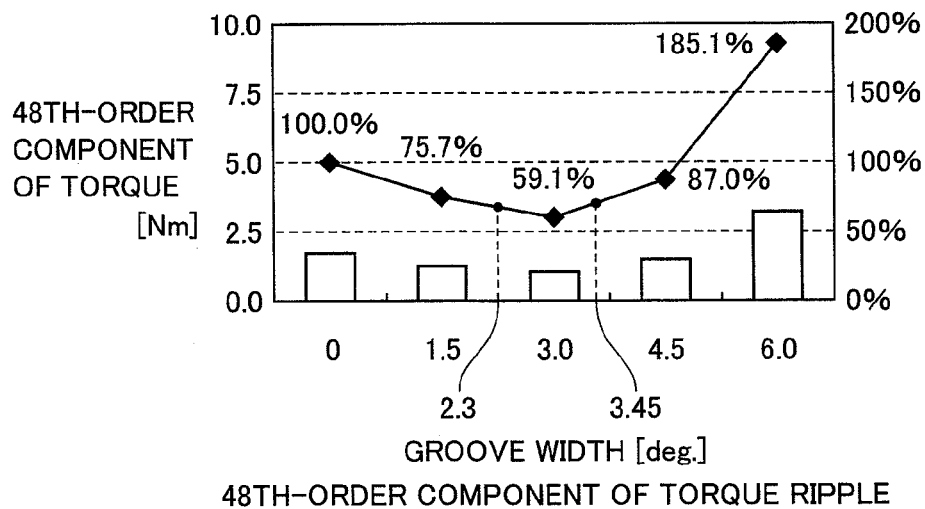
FIG. 7 is a graph showing simulation results, which illustrates a 48th-order component of the torque ripple generated when the various types of rotating electric machines having the different groove widths are driven.
Figure 8:
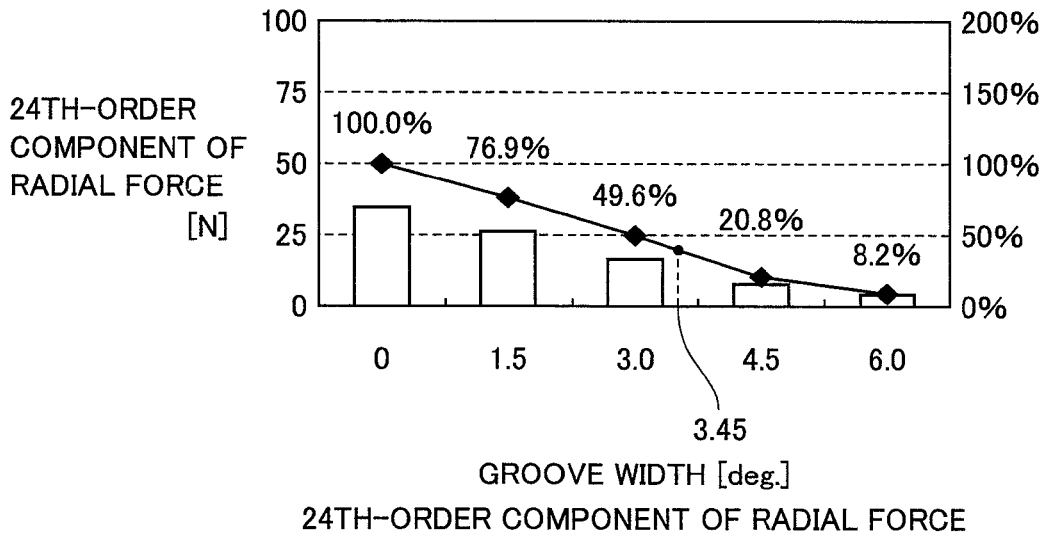
FIG. 8 is a graph showing simulation results, which illustrates a 24th-order component of radial force generated in the rotor when the various types of rotating electric machines having the different groove widths are driven.
Figure 9:
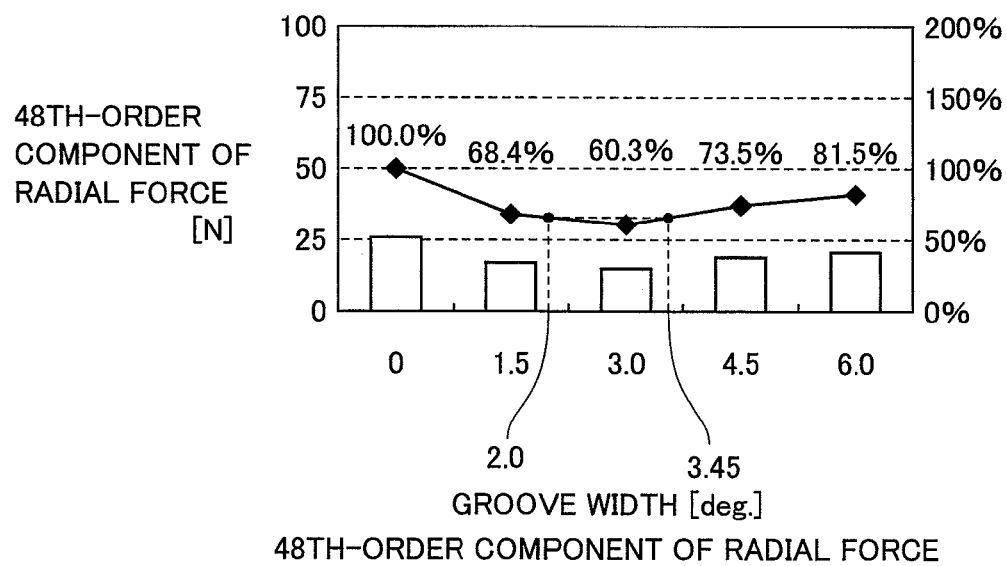
FIG. 9 is a graph showing simulation results, which illustrates a 48th-order component of the radial force when the various types of rotating electric machines having the different groove widths are driven.

FIG. 6 is a graph showing simulation results, which illustrates a 24th-order component of a torque ripple generated when various types of rotating electric machines 1 having different groove widths 51 are driven. FIG. 7 is a graph showing simulation results, which illustrates a 48th-order component of the torque ripple. FIG. 8 is a graph showing simulation results, which illustrates a 24th-order component of radial force generated in the rotor when the various types of rotating electric machines 1 having different groove widths 51 are driven. FIG. 9 is a graph showing simulation results, which illustrates a 48th-order component of the radial force.

Noise generated as a result of drive of rotating electric machine 1 is composed of various types of noises superimposed on one another. In the motor generator having three phases and eight poles such as rotating electric machine 1 according to the present embodiment, of noise components of respective orders obtained through the Fourier transform of the noise generated as a result of drive of rotating electric machine 1, 24th-order noise corresponding to the least common multiple of the number of phases and the number of poles becomes higher. In addition, of the noise components of the respective orders obtained through the Fourier transform of the noise generated as a result of drive of rotating electric machine 1, noise of an order corresponding to the number of slots also becomes higher.

In FIG. 6, a horizontal axis represents the width of groove 51 in electrical angle, and a vertical axis on the left represents the 24th-order component of the torque ripple. Further, a vertical axis on the right represents, assuming that the 24th-order component of the torque ripple generated in the rotating electric machine without groove 51 is 100%, magnitude of the 24th-order component of the torque ripple generated with variation in width of each groove.

As shown in FIG. 6, it can be seen that the magnitude of the 24th-order component of the torque ripple can be expected to become smaller with increase in width (t1) of groove 51. With the reduction in 24th-order component of the torque ripple, the 24th-order component of the motor noise obtained through the Fourier transform of the motor noise generated when rotating electric machine 1 is driven can be reduced.

That is, by making the width (t1) of each of grooves 51A and 51B to be greater than 0 degree (electrical angle) and not greater than 6 degrees (electrical angle) in FIG. 3, the 24th-order component of the torque ripple can be reduced.

Further, the ratio of width t1 (electrical angle) of groove 51 in the circumferential direction to electrical angle C (salient pole portion) defined by an imaginary straight line 16 passing through one circumferential end 54A of salient pole portion 60 and central point O of rotor 10 and by center line 11 is greater than 0 and not greater than 0.07.

In FIG. 8, a horizontal axis represents the width of groove 51 in electrical angle, and a vertical axis on the left represents a 24th-order component of radial force. Further, a vertical axis on the right represents, assuming that the 24th-order component of the radial force generated in the rotating electric machine without groove 51 is 100%, magnitude of the 24th-order component of the radial force generated with variation in width of each groove.

As shown in FIG. 8, it can be seen that the 24th-order component of the radial force can be significantly reduced when the width of groove 51 in the circumferential direction is greater than 0 degree in electrical angle. With such reduction in the 24th-order component of the radial force, the 24th-order component of the motor noise generated when rotating electric machine 1 is driven is reduced. That is, by making the width (t1) of each of grooves 51A and 51B to be greater than 0 degree (electrical angle) and not greater than 6 degrees (electrical angle) in FIG. 3, the 24th-order component of the torque ripple can be reduced. The ratio of width t1 of groove 51 in the circumferential direction to electrical angle C (salient pole portion) defined by imaginary straight line 16 passing through one circumferential end 54A of salient pole portion 60 and central point O of rotor 10 and by center line 11 is greater than 0 and not greater than 0.07.

In FIG. 9, a horizontal axis represents the width of groove 51 in electrical angle, and a vertical axis on the left represents a 48th-order component of the radial force. Further, a vertical axis on the right represents, assuming that the 48th-order component of the radial force generated in the rotating electric machine without groove 51 is 100%, magnitude of the 48th-order component of the radial force generated with variation in width of each groove.

As shown in FIG. 9, it can be seen that the 48th-order component of the radial force is low in a range where the width of groove 51 in the circumferential direction is greater than 0 degree (electrical angle). Thus, the 48th-order component of the motor noise generated when rotating electric machine 1 is driven can be reduced.

That is, by making the width (t1) of each of grooves 51A and 51B to be greater than 0 degree (electrical angle) and not greater than 6 degrees (electrical angle) in FIG. 3, the 48th-order component of the radial force can be reduced. The ratio of width t1 of groove 51 in the circumferential direction to electrical angle C (salient pole portion) defined by imaginary straight line 16 passing through one circumferential end 54A of salient pole portion 60 and central point O of rotor 10 and by center line 11 is greater than 0 and not greater than 0.07.

From the above data shown in FIGS. 6, 8 and 9, it can be seen that the 24th-order component and the 48th-order component of the motor noise can be reduced by forming groove 51 and salient pole portion 60 such that the ratio of width t1 of groove 51 in the circumferential direction to electrical angle C (salient pole portion) defined by imaginary straight line 16 passing through one circumferential end 54A of salient pole portion 60 and central point O of rotor 10 and by center line 11 is greater than 0 and not greater than 0.07. In other words, it can be seen that the 24th-order component and the 48th-order component of the noise generated in rotating electric machine 1 can be reduced by forming an electrical angle of 84 degrees between circumferential end 54A of salient pole portion 60 and center line 11, and with this circumferential end 54A serving as a reference position, further forming the groove extending to a side opposite to salient pole portion 60 of rotor 100.

It can also be seen in FIG. 9 that the 48 components of the radial force are reduced in a range where the width of groove 51 in the circumferential direction is less than 3.45 degrees in electrical angle.

When width t1 of groove 51 is thus set to 3.45 degrees in electrical angle, width t2 of protrusion 52 in the circumferential direction is set to 5.1 degrees (electrical angle). Since a sum of a width half the width t2 of protrusion 52 (t2/2) and width t1 of groove 51 is 6 degrees in electrical angle, width t2 of protrusion 52 increases with decrease in width t1 of groove 51.

Accordingly, a ratio of the width of groove 51 to the width half the width t2 of protrusion 52 is 0.37 or higher.

That is, by defining protrusion 52 and groove 51 such that the ratio of the width of groove 51 to the width half the width t2 of protrusion 52 is 0.37 or higher, the 48th-order component of the radial force can be suppressed to low level.

Since it is difficult to form groove 51 having an excessively small width, width t1 of groove 51A is preferably set to 0.46 degrees or greater. In this case, width t2 of protrusion 52 is set to 11.08 degrees (electrical angle).

Accordingly, the ratio of the width of groove 51 to the width half the width t2 of protrusion 52 is preferably not smaller than 0.37 and not greater than 6.

It can also be seen that the 48th-order component of the radial force can be reduced by making width t1 of groove 51 to be 2.0 degrees (electrical angle) or greater and 3.45 degrees (electrical angle) or smaller. In this case, width t2 of protrusion 52 in the circumferential direction has an electrical angle not smaller than 5.1 degrees and not greater than 8.0 degrees. When groove 51 is formed to have width t1 within such a range, the 24th-order component of the torque ripple and the 24th-order component of the radial force are again suppressed to low level, as shown in FIGS. 6 and 8. Consequently, the 48th-order component of the noise can also be reduced while ensuring reduction in the 24th-order component of the motor noise.

In FIG. 7, a horizontal axis represents the width of groove 51 in electrical angle, and a vertical axis on the left represents the 48th-order component of the torque ripple. Further, a vertical axis on the right represents, assuming that the 48th-order component of the torque ripple generated in the rotating electric machine without groove 51 is 100%, magnitude of the 48th-order component of the torque ripple generated with variation in width of each groove.

As shown in FIG. 7, it can be seen that the 48th-order component of the torque ripple can be reduced when width t1 of groove 51 is less than 3.45 degrees in electrical angle.

That is, it can be seen that both the 48th-order component of the radial force and the 48th-order component of the torque ripple can be reduced by defining protrusion 52 and groove 51 such that the ratio of the width of groove 51 to the width half the width t2 of protrusion 52 is 0.37 or higher.

More preferably, width t1 of groove 51 is set to 2.3 degrees or greater and 3.45 degrees or smaller in electrical angle. It can be seen that particularly the 48th-order component of the torque ripple can be reduced by forming groove 51 as such.

When width t1 of groove 51 is set within such a range, the 24th-order component of the torque ripple and the 24th-order component of the radial force are again suppressed to low level, as shown in FIGS. 6 and 8. It is noted that the above simulation results shown in FIGS. 6 to 9 were calculated with magnetic field analysis software, such as J-MAG. While the embodiments of the present invention have been described as above, it should be understood that the embodiments disclosed herein are illustrative and non-restrictive in every respect. The scope of the present invention is defined be the terms of the claims, and is intended to include any modifications within the scope and meaning equivalent to the terms of the claims. Furthermore, the above numerical values and the like are illustrative, without limited to the above numerical values and ranges.

INDUSTRIAL APPLICABILITY

The present invention is suitable for a rotating electric machine.

The invention claimed is:

1. A rotating electric machine comprising:
   a stator including a plurality of winding phases formed by distributed winding;
   a rotor including a plurality of magnetic poles and an outer circumference facing said stator;
   a first groove formed in said outer circumference of said rotor;
   a second groove formed in a position opposite to reference magnetic poles closest to said first groove, of said magnetic poles, with respect to said first groove; and
   a protrusion positioned between said first groove and said second groove and defined by said first and said second grooves,
   a ratio of a width half the width of said protrusion in a circumferential direction of said rotor to a width of said first groove and said second groove in the circumferential direction of said rotor being not smaller than 0.37 and not greater than 6,
   the width of said first groove in the circumferential direction of said rotor is not smaller than 2.3 degrees and not greater than 3.45 degrees in electrical angle, and
   a sum of an electrical angle of the width half the width of said protrusion in the circumferential direction of said rotor and an electrical angle of the width of said first groove in the circumferential direction of said rotor is constant.

2. The rotating electric machine according to claim 1, wherein the width of said protrusion is not smaller than 5.1 degrees and not greater than 7.4 degrees in electrical angle.

3. The rotating electric machine according to claim 1, wherein
   said first groove extends from a reference position on the outer circumference of said rotor, away from a center line of the reference magnetic poles closest to said first groove, and
   said reference position is positioned such that an electrical angle formed by an imaginary straight line passing through the reference position and a central point of said rotor and by a center line of said reference magnetic poles is set to 84 degrees.

4. The rotating electric machine according to claim 1, wherein an imaginary straight line defined by one circumferential end of a salient pole portion and a central point of said rotor does not pass through a magnet provided within the rotor.

5. A rotating electric machine comprising:
   a stator including a plurality of winding phases formed by distributed winding;
   a rotor including a plurality of magnetic poles and an outer circumference facing said stator;
   a permanent magnet buried in said rotor and defining said magnetic pole;
   a plurality of salient pole portions positioned radially outward in said rotor relative to said magnet and formed on the outer circumference of said rotor at a distance from one another in a circumferential direction of said rotor; and
   a groove formed in the outer circumference of said rotor adjacent to said salient pole portion and extending from a circumferential end of said salient pole portion to a position between the circumferential end and a first reference position of said rotor,
   said first reference position being positioned such that an electrical angle formed by an imaginary straight line passing through the first reference position and a central point of said rotor and by a center line of said magnetic pole is set to 90 degrees, and
   a ratio of an electrical angle of said groove in the circumferential direction of said rotor to an electrical angle half the electrical angle of said salient pole portion in the circumferential direction of said rotor being greater than 0 and not greater than 0.07.

6. The rotating electric machine according to claim 5, wherein an imaginary straight line defined by one circumferential end of a salient pole portion and a central point of said rotor does not pass through a magnet provided within the rotor.

7. A rotating electric machine comprising:
   a stator including a plurality of winding phases formed by distributed winding;
   a rotor including a plurality of magnetic poles and an outer circumference facing said stator;
   a plurality of salient pole portions formed on the outer circumference of said rotor at a distance from one another in a circumferential direction of said rotor; and
   a groove formed in the outer circumference of said rotor adjacent to said salient pole portion, and
   an electrical angle formed by a first end imaginary straight line defined by one circumferential end of said salient pole portion and a central point of said rotor and by a second end imaginary straight line defined by the other circumferential end of said salient pole portion and the central point of said rotor is set to 84 degrees.

8. The rotating electric machine according to claim 7, wherein the imaginary straight line defined by the one circumferential end of said salient pole portion and the central point of said rotor does not pass through a magnet provided within the rotor.

\* \* \* \* \*